Feb. 4, 1958    R. C. KOCH ET AL    2,822,019
CHAFER GUM STRIP
Filed Jan. 3, 1956

INVENTORS
ROBERT C. KOCH
ROBERT P. POWERS
BY
W. A. Fraser
ATTY

United States Patent Office 2,822,019
Patented Feb. 4, 1958

2,822,019

CHAFER GUM STRIP

Robert C. Koch and Robert P. Powers, Akron, Ohio, assignors to The Firestone Tire & Rubber Company, Akron, Ohio, a corporation of Ohio Application January 3, 1956, Serial No. 557,069

7 Claims. (Cl. 152—362)

This invention relates to the bead of a pneumatic tire and more particularly to the bead chafer and a method for preparing the chafer to protect the tire bead from the abrasive action of the wheel rim on which the tire is mounted.

A pneumatic tire relies for stability on two circular rubberized wire bundles anchored in the rubber insulated fabric of the tire body to form what is called the bead portion. This portion of the tire is the portion at the edges of the tire body enclosing the wire bundles and adapted for mounting the tire on the wheel of the vehicle. The practice had been to use the marginal edges of the fabric plies of the body of the tire turned alternately up and down around each of the rubberized wire bundles to secure the bundles to the respective edges of the tire. A difficulty encountered with this construction is that wheel rotation causes the wheel rim flange to rub against the fabric in the bead portion to produce scuffing, and cutting with resulting tire failure.

The proposal has been advanced to protect the bead portion from rim flange rubbing by the use of a rubberized square-woven fabric strip adhered to and covering the rubberized fabric plies at the edges of the tire body. Difficulties have been encountered in using such rubber-covered strips in that the rubber coating squeezes out of position during vulcanization of the tire in a mold to expose the fabric in the area between the heel of the bead and the sidewall of the tire where greatest thickness of rubber is required for protection. The fabric of the chafer strip thus denuded of the rubber coating is unsatisfactory protection to the bead from the rubbing of the rim, since fabric alone has little chafe-resistance.

The present invention overcomes the disadvantages of the prior art by providing a tire bead construction wherein the fabric chafer strip is insulated from the fabric plies of the tire by a layer of rubbery material having substantial thickness as well as resistance to deformation at the temperatures and pressures of vulcanization of the tire. One such material contains a high loading of silica.

It is, therefore, an object of this invention to provide means for protecting the bead portion of a pneumatic tire from the chafing action of a rim on which the tire is mounted. It is also an object of this invention to provide a tire bead protected by a fabric chafer strip coated on the outer side with a highly abrasion resistant rubbery material resistant to displacement during tire vulcanization and separated from the other elements of the tire by a substantial layer of cushioning rubber material.

Yet another object of the invention is to provide a tire bead wherein the chafer strip is separated from the plies of the tire by a cushion thickness of rubbery material loaded with silica.

Figure 1:
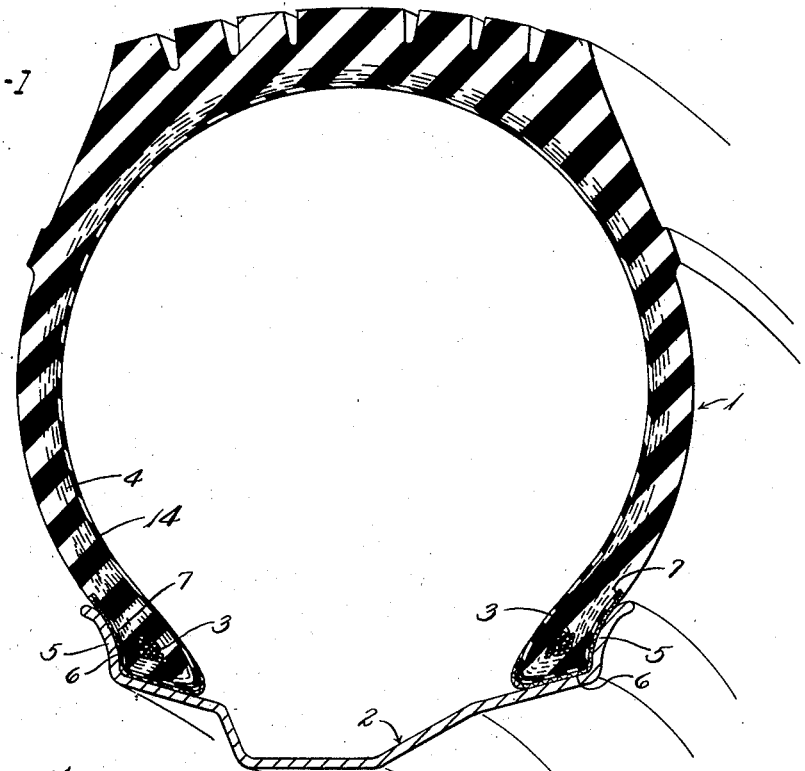
Figure 1 is a sectional view of a tire of the invention partially in perspective.
Figure 2:
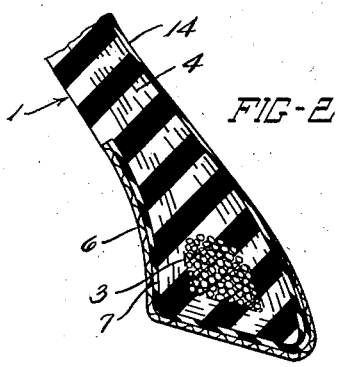
Figure 2 is a sectional view of a tire in accordance with the invention after vulcanization illustrating the position of the cushioning layer under the protecting chafer strip.

In reference to Figure 1, a tubeless truck tire generally indicated at 1 is mounted on a drop center rim 2. Each tire bead 3 is of metal wire construction held to the tire by the lapping of the fabric plies 4 and protected from rubbing by rim flanges 5 by chafer strips 6. Abrasion occurs during rotation of the wheel wherein slight play and wobble between the tire beads and the rim 2 causes the hard metal flanges 5 to rub against the respective beads of the tire. In view of the invention, a rubbery layer 7 separates the chafer strips from the fabric plies of the tire. This layer, of a composition later to be described, has resistance to displacement from the bead area during vulcanization and during and after that operation maintains a substantial resilient cushion layer in the vulcanized tire.

During operation of the wheel, the tire beads chafe against the rim flanges and seats 5 but the chafers 6 tend to yield to this action because of resilient cushioning layers 7 separate them from the plies of the tire. The slight deflection of the chafer strips greatly reduces the abrasive action of the rim flanges and seats 5 against the bead. Tires with this bead chafer construction will run further before chafing results in serious damage to the beads than will tires of conventional bead construction. An example of the composition used in the cushioning layers 7 in the novel construction is as follows, all parts being based on 100 parts of rubbery hydrocarbon:

*Example I*

| | |
|---|---|
| Rubber | 100.00 |
| Silica [1] | 65.00 |
| Zinc oxide | 5.00 |
| Stearic acid | 3.00 |
| Pine tar | 2.00 |
| Carbon black | 33.00 |
| Diethylene glycol | 1.50 |
| Antioxidant | 1.50 |
| Sulfur | 2.50 |
| Accelerator | 1.50 |
| | 215.00 |

[1] Such as Hi Sil sold by the Columbia Southern Company, Barberton, Ohio.

The composition of the above formulation was mixed on an open two roll mill until all of the ingredients were dispersed in the rubber, sheeted off into strips approximately .060 inch in thickness and 4 inches wide and laid on a previously formed chafer strip of fabric impregnated, preferably by calendering, with unvulcanized rubber.

Figure 3:
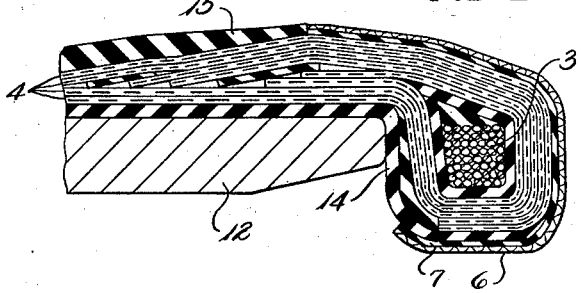
Figure 3 is a fragmentary, sectional view of a tire bead on a tire building drum showing features of the invention before the tire is vulcanized.

A tubeless tire is constructed in the conventional manner by plying up thicknesses of rubber and rubberized fabric strain members 4 on a tire building drum 12 (Fig. 3) with inextensible metallic hoops 3 anchored to the edges of the tire casing by the lapping of the fabric strain members. An air impervious rubbery inner liner 14 is placed to cover the innermost surface of the tire wall and turned up around the fabric covered hoops. A rubbery portion 15 is superimposed upon the crown portion of the tire to form a tread with edges extending to the beads. The chafer strips 6 backed with a layer of silica-loaded rubber 7 are next placed on the beads of the tire with the silica-loaded layer 7 against the outer surface of the innerliner 14 and fabric strain members incasing the metal hoops 3. The tire is removed from the tire building drum, shaped and vulcanized for about 80 minutes in a closed mold at 275° F. The silica-loaded rubbery layer 7 between the chafer strip 6 and outer surface of the air impervious member 14 has a plasticity such that it will not deform and squeeze out of position when the tire is vulcanized in a closed mold with an internal steam pressure against the inner wall surface of the tire of 170 lbs. per square inch. Such a silica-loaded compound must have a plasticity value of at least 6.5 and even as high as 10 or higher when measured by the Williams Plastometer at 212° F. The desired plasticity may be obtained by varying either the amount or the particle size of silica used.

A tire so shaped and vulcanized was removed from the mold, allowed to cool and mounted on a rim of the wheel of a vehicle. After continuous periods of road operation at conditions of extreme hot running of the tire at high overloads, the chafer strip 6 was not seriously injured. In fact, after 9,000 miles of operation, little or no abrasion showed on the outside surface of the tire bead while a tire of conventional bead construction was badly damaged in the chafer area.

Another example of a rubber material having suitable properties for the rubber insulating layer between the chafer strip and the other parts of the bead of the tire is as follows, all parts based on 100 parts of rubber hydrocarbon:

*Example II*

| | |
|---|---|
| Rubber | 100 |
| Super beckacite [1] | 10 |
| Carbon black | 4.0 |
| Softener | 4.2 |
| Zinc oxide | 2.8 |
| Stearic acid | 1.4 |
| Sulfur | 2.8 |
| Antioxidant | 1.0 |
| Accelerator | 1.7 |
| | 163.9 |

[1] Phenolic type resin by Reichold Chemical Co.

A composition according to the foregoing formula may be mixed on a conventional two roll mill, sheeted out on a calender into sheets about .050 inch thick and cut into strips about four inches wide. The strips are precured for 4 hours in an atmosphere of circulating air at a temperature of 230° F., placed in the position of strips 7 in Figure 3 during construction of the tire and the tire vulcanized. The precured strip maintained its original thickness during vulcanization and served as a resilient cushion for the chafer when the tire was operated on a vehicle wheel.

In the preferred example of the invention, the chafer strip has been disclosed as a strip of rubberized square woven fabric but this element may be either rubberized weftless fabric or a sheet of rubberized woven plastic monofilament such as nylon.

Although the rubber shown in the compositions is described as natural rubber, synthetic rubber such as the rubbery copolymer of butadiene-styrene, butadiene-acrylonitrile, isobutylene-isoprene, isobutylene-styrene, polychloroprene may be used. Such rubbery materials may be mixed with plastics such as chlorosulfinated polythene, phenol-aldehyde resins, and polymers of the vinyl plastics such as polyvinyl chloride and vinyl chloride vinyl acetate copolymers.

For the rubbery materials used in the invention, many accelerators are known to the art. Among those available are the thiazoles, the dithiocarbamates, the thiuram sulfides, for example, benzothiazole disulfide, mercaptobenzothiazole, cyclohexylbenzothiazole sulfenamide and zinc dimethyl dithiocarbamate. Magnesium oxide among others is useful for accelerating the polychlorobutadiene types of polymers. Also available are the aldehydeamine and guanidine type accelerators such as formaldehyde-ammonia and diphenylguanidine, and many more known to those versed in the art of rubber compounding.

In the claims:

1. An open-bellied pneumatic tire comprising a toroidal rubberized fabric body having plies of vulcanized, rubberized, strain members, said body terminating at its edges in two inextensible hoops around which are turned respectively the margins of the strain members to form two beads for mounting on a rim, a rubberized abrasion-resistant strip forming the outer peripheral surface of each bead, and a ply of a vulcanized rubbery composition compounded to have a Williams plasticity of between 6.5 and 10 at 212° F. in the unvulcanized state, interposed between and bonded to the outermost strain member and the abrasion strip over the rim-engaging area of the bead.

2. An open-bellied pneumatic tire comprising a toroidal rubberized fabric body having plies of vulcanized, rubberized, strain members, said body terminating at its edges in two inextensible hoops around which are turned respectively the margins of the strain members to form two beads for mounting on a rim, a rubberized abrasion strip forming the outer peripheral surface of each bead comprised of silica-oxide in admixture therewith having a William plasticity of 6.5 to 10 at 212° F. in the unvulcanized state interposed between and bonded to the outermost strain member and the abrasion strip, over the rim-engaging area of each bead.

3. An open-bellied pneumatic tire comprising a toroidal rubberized fabric body having plies of vulcanized, rubberized, strain members, said body terminating at its edges in two inextensible hoops around which are turned respectively the margins of the strain members to form two beads for mounting on a rim, an abrasion strip comprised of rubberized plastic monofilaments forming the outer peripheral surface of each bead, and a ply of a vulcanized rubbery composition having a Williams plasticity of from 6.5 to 10 at 212° F. in the unvulcanized state interposed between and bonded to the outermost strain member and the abrasion strip, over the rim-engaging area of each bead.

4. An open-bellied pneumatic tire comprising a toroidal rubberized fabric body having plies of vulcanized, rubberized, strain members, said body terminating at its edges in two inextensible hoops around which are turned respectively the margins of the strain members to form two beads for mounting on a rim, an abrasion strip comprised of rubberized nylon monofilaments forming the outer peripheral surface of each bead, and a ply of a vulcanized rubbery composition having a Williams plasticity of from 6.5 to 10 at 212° F. in the unvulcanized state interposed between and bonded to the outermost strain member and the abrasion strip, over the rim-engaging area of each bead.

5. An open-bellied pneumatic tire comprising a toroidal rubberized fabric body having plies of vulcanized, rubberized, strain members, said body terminating at its edges in two inextensible hoops around which are turned respectively the margins of the strain members to form two beads for mounting on a rim, an abrasion strip comprising rubberized plastic monofilaments forming the outer peripheral surface of each bead, and a ply of a vulcanized rubbery composition, comprised of silica oxide in admixture therewith having a Williams plasticity of from 6.5 to 10 at 212° F. in the unvulcanized state interposed between and bonded to the outermost strain member and the abrasion strip over the rim-engaging area of each bead.

6. An open-bellied pneumatic tire comprising a toroidal rubberized body having plies of vulcanized, rubberized, strain members, said body terminating at its edges in two inextensible hoops around which are turned respectively the margins of the strain members to form two beads for mounting on a rim, a rubberized fabric abrasion strip forming the outer peripheral surface of each bead, and a ply of a vulcanized rubber composition having a Williams plasticity of from 6.5 to 10 at 212° F. in the unvulcanized state interposed between and bonded to the outermost strain member and the abrasion strip over the rim-engaging area of each bead.

7. An open-bellied pneumatic tire comprising a toroidal rubberized body having plies of vulcanized, rubberized, strain members, said body terminating at its edges in two inextensible hoops around which are turned respectively the margins of the strain members to form two beads for mounting on a rim, a rubberized fabric abrasion strip forming the outer peripheral surface of each bead, and a ply of a vulcanized rubber composition comprising silica oxide in admixture therewith having a Williams plasticity of from 6.5 to 10 at 212° F. in the unvulcanized state, interposed between and bonded to the outermost strain member and the abrasion strip, over the rim-engaging area of each bead.

References Cited in the file of this patent

UNITED STATES PATENTS

| | | |
|---|---|---|
| 2,484,620 | Glen | Oct. 11, 1949 |
| 2,592,844 | Antonson | Apr. 15, 1952 |